(12) United States Patent
Gupta et al.

(10) Patent No.: US 10,331,480 B2
(45) Date of Patent: Jun. 25, 2019

(54) CONTEXTUAL APPLICATION ORGANIZER FRAMEWORK FOR USER LIFE EVENTS

(71) Applicant: MICROSOFT TECHNOLOGY LICENSING, LLC, Redmond, WA (US)

(72) Inventors: Rahul Gupta, Telangana (IN); Pradeep Kumar Reddy K, Telangana (IN); Bhavesh Sharma, Telangana (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 170 days.

(21) Appl. No.: 15/439,202

(22) Filed: Feb. 22, 2017

(65) Prior Publication Data

US 2018/0239637 A1    Aug. 23, 2018

(51) Int. Cl.
| | |
|---|---|
| G06F 9/46 | (2006.01) |
| G06F 9/48 | (2006.01) |
| G06N 20/00 | (2019.01) |
| G06Q 10/04 | (2012.01) |

(52) U.S. Cl.
CPC ........... G06F 9/4881 (2013.01); G06N 20/00 (2019.01); G06Q 10/04 (2013.01)

(58) Field of Classification Search
None
See application file for complete search history.

(56) References Cited

U.S. PATENT DOCUMENTS

| | | |
|---|---|---|
| 8,468,164 B1 | 6/2013 | Paleja et al. |
| 8,914,399 B1 | 12/2014 | Paleja et al. |
| 2007/0083827 A1 | 4/2007 | Scott et al. |
| 2011/0072492 A1 | 3/2011 | Mohler et al. |
| 2012/0143694 A1 | 6/2012 | Zargahi et al. |
| 2012/0323898 A1* | 12/2012 | Kumar ............ G06F 17/30899 707/723 |
| 2013/0014040 A1 | 1/2013 | Jagannathan et al. |
| 2013/0283283 A1 | 10/2013 | Wang et al. |
| 2014/0123022 A1 | 5/2014 | Lee et al. |
| 2014/0201681 A1 | 7/2014 | Mahaffey et al. |
| 2014/0280131 A1 | 9/2014 | Martens et al. |

(Continued)

OTHER PUBLICATIONS

Baeza-Yates, et al., "Predicting the Next App That You Are Going to Use", In Proceedings of the Eighth ACM International Conference on Web Search and Data Mining, Feb. 2, 2015, 10 pages.

(Continued)

*Primary Examiner* — Gregory A Kessler (74) *Attorney, Agent, or Firm* — Shook, Hardy & Bacon L.L.P.

(57) ABSTRACT

A contextual application organizer framework learns about application usage behavior based on user context from multiple different signals (e.g., email, OFFICE graph, Short Message Service, browsing history, search history, device usage, location) and surfaces relevant applications that a user may need for the current context or activity. A user context graph is created from user life events and an index of user activity of applications. Application usage signals are mapped from user preferences and world knowledge to the user context graph. Upon detecting a current user context, relevant applications derived from the user context graph are surfaced in a contextual application organizer.

19 Claims, 7 Drawing Sheets

(56) References Cited

U.S. PATENT DOCUMENTS

| | | | |
|---|---|---|---|
| 2014/0280443 A1* | 9/2014 | Sivalingam | G06F 8/65 709/201 |
| 2015/0106737 A1 | 4/2015 | Montoy-wilson et al. | |
| 2015/0142785 A1* | 5/2015 | Roberts | G06F 17/30528 707/723 |
| 2016/0188145 A1 | 6/2016 | Vida et al. | |
| 2016/0321573 A1 | 11/2016 | Vangala et al. | |
| 2017/0032248 A1 | 2/2017 | Dotan-cohen et al. | |

OTHER PUBLICATIONS

Bohmer, et al., "Contextualizing Mobile Applications for Context-aware Recommendation", In Proceedings of Pervasive, May 20, 2010, 4 pages.

"International Search Report and Written Opinion Issued in PCT Application No. PCT/US18/017146", dated May 15, 2018, 12 Pages.

\* cited by examiner

CONTEXTUAL APPLICATION ORGANIZER FRAMEWORK FOR USER LIFE EVENTS

BACKGROUND

The recent past has seen an exponential growth in the number of online service providers. With the advent of smartphones and other portable devices, similar growth has been witnessed in the number of applications and application providers. Most of these applications solve only a portion of user needs and the user ends up having multiple applications installed to cater to all user needs (e.g., listening to music, purchasing movie tickets, event booking, gaming, flight reservations, restaurant searches, transportation, etc.) For example, the user may wish to purchase movies tickets for a Friday evening. To accomplish this task, the user launches FANDANGO. To reach the movie theater from home, the user may request a ride by launching UBER. Before or after the movie, the user may look for dining options by launching FOURSQUARE.

Further, users typically exhibit certain patterns in their life activity for a particular time of day or day in the week. Users may repeatedly use some applications or services based on these patterns of activity. For example, a user that has launched a music application (e.g., MICROSOFT GROOVE) may exhibit many different patterns. While commuting to work, the user may listen to a different genre of music than while at work, at the gym, at home while doing household chores, or at home before going to bed.

In an enterprise scenario, users use different applications depending on who they might be working with or meeting at a particular time. For example, a program manager may use ONENOTE for taking scrum notes when meeting with the development team. On the other hand, the same user may use POWERPOINT to present an executive summary when meeting with the leadership team. In another example, the user may use a camera application on a mobile device to whiteboard photographs for a discussion with the design team. As the examples illustrate, the user has to manually find each relevant application that is needed based on the current context.

In today's world users either organize applications manually by keeping the most used ones on their home screen, by grouping the applications into categories, or by using an application launcher that organizes applications based on most recent use or usage history. However, none of these solutions take into account the actual context of the user.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein provides a contextual application organizer framework. The contextual application organizer framework learns about application usage behavior based on user context from multiple different signals (e.g., email, OFFICE graph, Short Message Service (SMS), browsing history, search history, device usage, location) and surfaces relevant applications that a user may need for the current context or activity. Initially, a user context graph is created from user life events and an index of user activity of applications. Application usage signals are mapped from user preferences and world knowledge to the user context graph. Upon detecting a current user context, relevant applications derived from the user context graph are surfaced in a contextual application organizer.

BRIEF DESCRIPTION OF THE DRAWINGS

The present invention is described in detail below with reference to the attached drawing figures, wherein.

DETAILED DESCRIPTION

The technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

As noted in the Background, users organize applications manually by keeping the most used ones on their home screen, by grouping the applications into categories, or by using an application launcher that organizes applications based on most recent use or usage history. However, none of these solutions take into account the actual context of the user.

The technology described herein solves the user problem of managing multiple applications by creating an intelligent framework that adapts itself to pick the most relevant applications based on the current context of the user. In this way, the framework surfaces the most relevant application for the current task or activity of the user based on learned knowledge of user life events and actions.

In embodiments, the framework comprises three primary features: 1) creating a user context graph from user life events and an index of user activity of applications; 2) mapping application usage signals comprising user preferences and world knowledge to the user context graph; and 3) upon detecting a current user context, surfacing relevant applications derived from the user context graph in a contextual application organizer.

Initially, contextual information from user activity on the device and application usage signals are utilized to learn contextual patterns of use of applications on a particular device. The contextual patters may be learned from multiple different signals (e.g., email, OFFICE graph, SMS, browsing history, search history, device usage, location, etc.). The framework applies reasoning of top of the multiple signals of user activity and creates a user context graph.

Next, the framework relates or maps the application usage signals to the context graph to make available the most contextually relevant applications to the user. In this way, the framework learns about the repeated application usage patterns of the user on the device.

The framework provides a single place to find the most contextually relevant applications, saving time and effort. Additionally, the framework not only takes into account user behavior but also utilizes world knowledge to predict contextually relevant applications even if a particular user has not experienced the current user context before. The framework learns over time about user preferences to surface the most relevant applications for the current task or activity. Accordingly, the framework provides an adaptive environment and is not dependent on specific time based repeated patterns or any particular location or position of the user.

Accordingly, one embodiment of the present disclosure is directed to a method of providing a contextual application organizer framework. The method comprises creating a user context graph from user life events and an index of user activity of applications. The method also comprises mapping application usage signals comprising user preferences and world knowledge to the user context graph. The method further comprises, upon detecting a current user context, surfacing relevant applications in a contextual application organizer, the relevant applications derived from the user context graph.

In another embodiment, the present disclosure is directed to a computer-readable storage medium comprising computer-executable instructions that, when executed by a computer, causes the computer to perform operations to facilitate providing a contextual application organizer framework. The operations include creating a user context graph from user life events and an index of user activity of applications. The operations also include mapping application usage signals comprising user preferences and world knowledge to the user context graph. The operations further include, upon detecting a current user context, surfacing relevant applications in a contextual application organizer, the relevant applications derived from the user context graph.

In yet another embodiment, the present disclosure is directed to a computerized system for providing a contextual application organizer framework. The system includes a processor and a computer storage medium storing computer-useable instructions that, when used by the processor, cause the processor to: create a user context graph from user life events and an index of user activity of applications; map application usage signals comprising user preferences and world knowledge to the user context graph; and, upon detecting a current user context, surface relevant applications in a contextual application organizer, the relevant applications derived from the user context graph.

Figure 1:
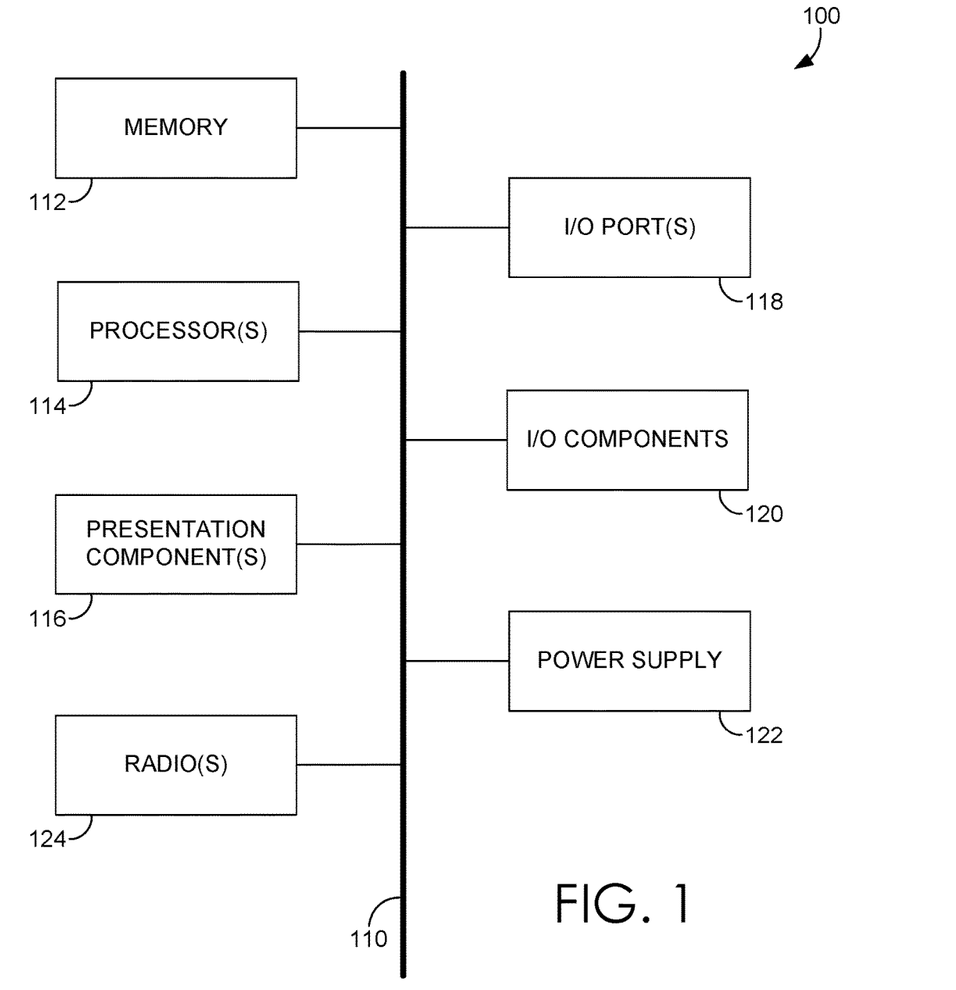
FIG. 1 is a schematic showing an exemplary computing environment suitable for use with the technology described herein.

Referring to the drawings in general, and initially to FIG. 1 in particular, an exemplary operating environment for implementing aspects of the technology described herein is shown and designated generally as computing device 100. Computing device 100 is but one example of a suitable computing environment and is not intended to suggest any limitation as to the scope of use or functionality of the technology described herein. Neither should the computing device 100 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112, or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 100. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

A computing device may include a radio 124. The radio 124 transmits and receives radio communications. The computing device may be a wireless terminal adapted to receive communications and media over various wireless networks. Computing device 100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Exemplary Contextual Application Organizer Framework

Figure 2:
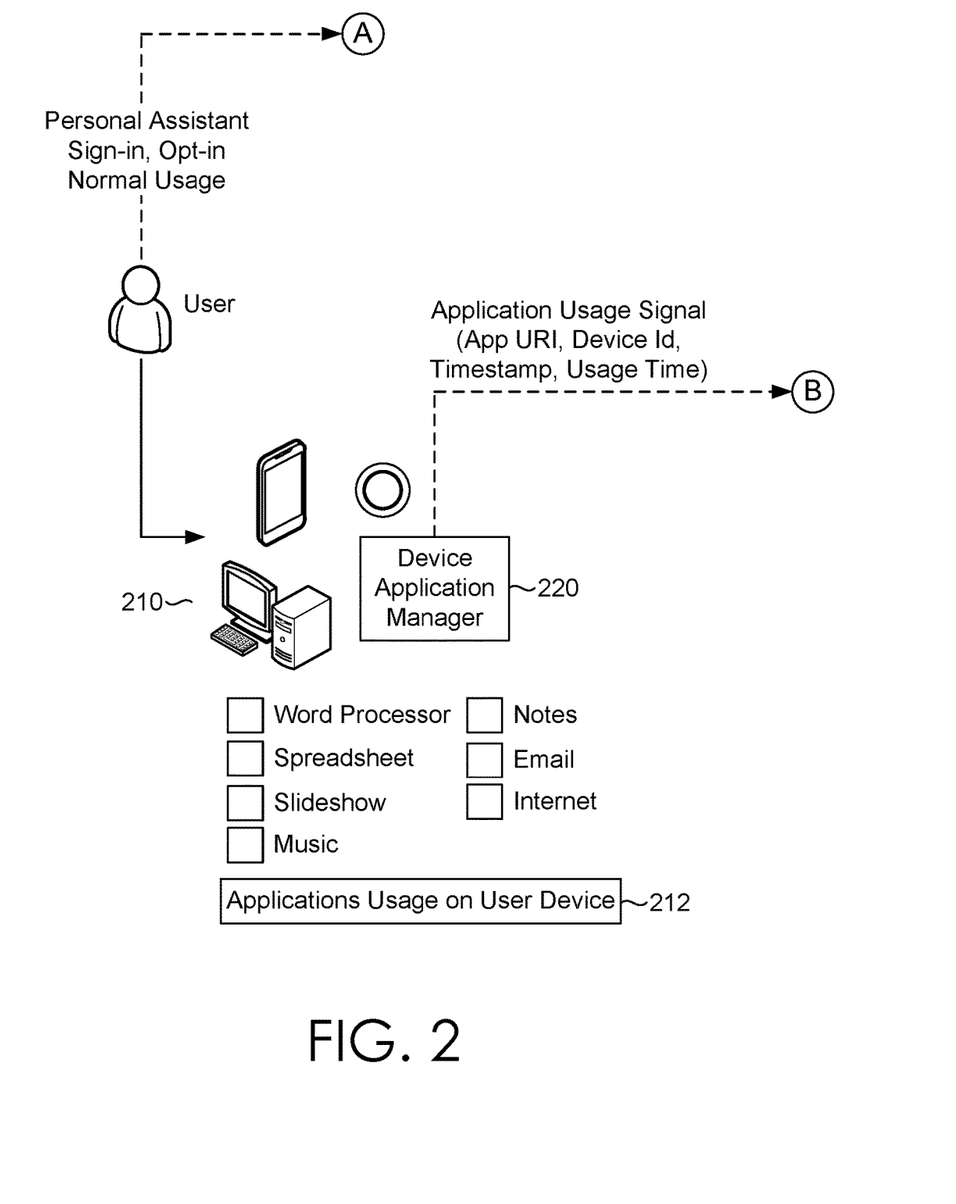
FIG. 2 is a block diagram showing am exemplary contextual application organizer framework, in accordance with aspects of the technology described herein.

Turning now to FIG. 2, a contextual application organizer framework 200 is shown, in accordance with an aspect of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The contextual application organizer framework 200 may be implemented via any type of computing device, such as computing device 100 described above with reference to FIG. 1, for example.

The contextual application organizer framework 200 generally operates to provide a user with the most relevant applications based on the current context of the user. As shown in FIG. 2, the contextual application organizer framework 200 includes, among other components not shown, user device 210, data stores 216, 222, 242, device application manager 220, application-context management framework 240, contextual application manager 250, application ranker 260, and contextual application organizer 270. It should be understood that the contextual application organizer framework 200 shown in FIG. 2 is an example of one suitable computing system architecture. Each of the components shown in FIG. 2 may be implemented via any type of computing device, such as computing device 100 described with reference to FIG. 1, for example.

The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of user devices, data stores, device application managers, application-context management frameworks, contextual application managers, application rankers, and contextual application organizers may be employed within the contextual application organizer framework 200 within the scope of the present disclosure. Each may comprise a single device or multiple devices cooperating in a distributed environment. For instance, the device application manager 220 or the application-context management framework 240 may be provided via multiple devices arranged in a distributed environment that collectively provide the functionality described herein. In other embodiments, a single device may provide the functionality of multiple components of contextual application organizer framework 200. For example, the application-context management framework 240 may include a contextual application manager, an application ranker, and a contextual application organizer (such as those shown in FIG. 2 and as described below). In some embodiments, some or all functionality provided by device application manager 220 (or other components) may be provided by user device 210. Additionally, other components not shown may also be included within the network environment.

As shown in FIG. 2, the contextual application organizer framework 200 includes a data stores 216, 222, 242. While data stores 216, 222, 242 are shown in FIG. 2, it should be understood that the contextual application organizer framework 200 may employ any number of data stores. Each data store 216, 222, 242 may store information that facilitate the contextual application organizer framework 200 in providing a user with the most relevant applications based on the current context of the user. For example, data store 216 stores user life events and activity signals received from various signals for a plurality of applications. Data store 222 receives application usage signals from a user device. In various embodiments, the application usage signals include application uniform resource identifier (URI), device identification (ID), timestamp, usage time, and the like. Data store 222 also receives feedback from the user that is utilized to dynamically update the application signals that are mapped to the user context graph, as described below. Data store 242 is an inferences store that stores the context graph and the mapped application signals.

The contextual application organizer framework 200 initially receives user life events (e.g., calendar, appointment, meeting, plan, relevant date, etc.) and an index of user activity of applications from various signals for a plurality of applications. The various signals are received via a personal assistant service (e.g., MICROSOFT Cortana) that the user may have signed into or opted into on the user device 210. In various embodiments, the signals are received from email, OFFICE graph, Short Message Service, browsing history, search history, device usage, and/or location. As can be appreciated, any application may provide a signal that can be used to identify a user life event. These user life events and activity signals are stored in data store 216. Machine leaning, statistical analysis, behavioral analytics, and/or data mining techniques can be applied to these signals to derive user task correlations. The user task correlations are utilized to create a user context graph 236. For clarity, user task correlations may include various tasks corresponding to a context of the user (e.g., for a date night context, the tasks may include making reservations for dinner, purchasing movie tickets, and finding transportation).

By way of example, other contexts and corresponding tasks may include: for a meeting context, the tasks may include sending out meeting requests, securing a meeting space, catering the meeting; for a birthday context, the tasks may include inviting guests, ordering a cake, purchasing gifts; for a Monday morning context, the tasks may include making appointments for the following weekend, securing a babysitter for Friday night, purchasing sporting event tickets, and the like. As can be appreciated any number of contexts and corresponding tasks may be identified and used to create the context graph.

Context signals may additionally be aggregated. For example, the machine leaning, statistical analysis, behavioral analytics, and/or data mining techniques may consider a non-behavioral aspect of the signals may be relevant to other aspects of the signals. Location may be relevant to the current or future task, an appointment on an electronic calendar, in an email message, or in an SMS message. Similarly, the machine leaning, statistical analysis, behavioral analytics, and/or data mining techniques may consider a current task may be relevant to a future task that can be performed.

Activity signals may include behavioral aspects that can be written as a function of time and application flow pattern and may also be aggregated. For example, the time dependence of application usage may be considered by the machine leaning, statistical analysis, behavioral analytics, and/or data mining techniques to consider that a user uses a particular application in the morning more often than other times of day. In another example, the machine leaning, statistical analysis, behavioral analytics, and/or data mining techniques may consider the application flow pattern (e.g., a user typically interacts with a restaurant application followed by a movie application followed by a transportation application). This enables the contextual application organizer framework 200 to consider the context in which a user uses multiple different application, at an individual application level and at an aggregate level in a group of applications on user device 210.

Device application manager 220 receives application usage signals 212 from user device 210. The application usage signals 212 may include application uniform resource identifier (URI), device identification (ID), timestamp, usage time, and the like. The application usage signals 212 are stored in data store 222. Statistical analysis, behavioral analytics, and/or trend analytics may be performed on the application usage signals 212 to learn user preferences 224. Additionally, or alternatively, and at an aggregate level, statistical analysis, behavior analytics, and/or trend analytics may also be performed to learn application usage patterns of other users in the world (i.e., world knowledge 226).

Each of the user preferences 224 and the world knowledge 226 may be dynamically weighted, in some embodiments, by device application manager 220. For example, user preferences 224 may be particularly useful when a user has experienced a particular context before. In this case, user preferences 224 may be weighted higher than world knowledge 226 when application signals are mapped to the user context graph 232. If, on the other hand, a particular context has not been experienced before by the user, world knowledge 226 may be weighted higher than user preferences 224 when application signals are mapped to the user context graph 232. Additionally, feedback can be provided by the user (such as by interacting with an application that has been surfaced, not interacting with an application that has been surface, or by interacting with an application other than one that has been surfaced), and the weights may be adjusted accordingly.

Once application signals comprising patterns of user preferences 224 and patterns and trends of world knowledge 226 have been learned, they are mapped to the user context graph 232. This enables the current context of the user to be tied to user preferences and/or world knowledge of specific application usage. In some embodiments, task conflation is utilized to create aggregates of multiple tasks for the context, which enable the contextual application organizer framework 200 to surface multiple relevant applications to accomplish multiple tasks for the given context (e.g., make dinner plans, purchase movie tickets, and find transportation).

The context graph and mapped application signals are stored in data store 242 by application-context management framework 240. Context signals are received from the context graph and mapped application signals and used to identify a context 244. The context may be described in the user life events and user activity from the various signals for the plurality of applications that were used to create the context graph. The relevant context is communicated to contextual application manager 250 which separates out context tokens corresponding to each identified context. Each context token may describe one or more tasks corresponding to an identified context. In some embodiments, the application-context management framework 240 receives and ranks tasks identified by the context tokens. Application-context management framework 240 utilizes the ranked tasks to create an aggregated context subgraph that is utilized to retrieve an application subgraph from data store 242.

The application subgraph and a ranked list of applications relevant to the context tokens is communicated by the application-context management framework 240 to the contextual application manager 250. The contextual application manager 250 communicates the applications to application ranker 260 which ranks the applications based on relevance, severity, priority, and duration. The ranked list of applications is then provided to a user via the contextual application organizer 270. User feedback (i.e., contextual application interaction signals) may be received from the user to re-train the application ranker 260 or adjust the weights of the user preferences and world knowledge.

Figure 3:
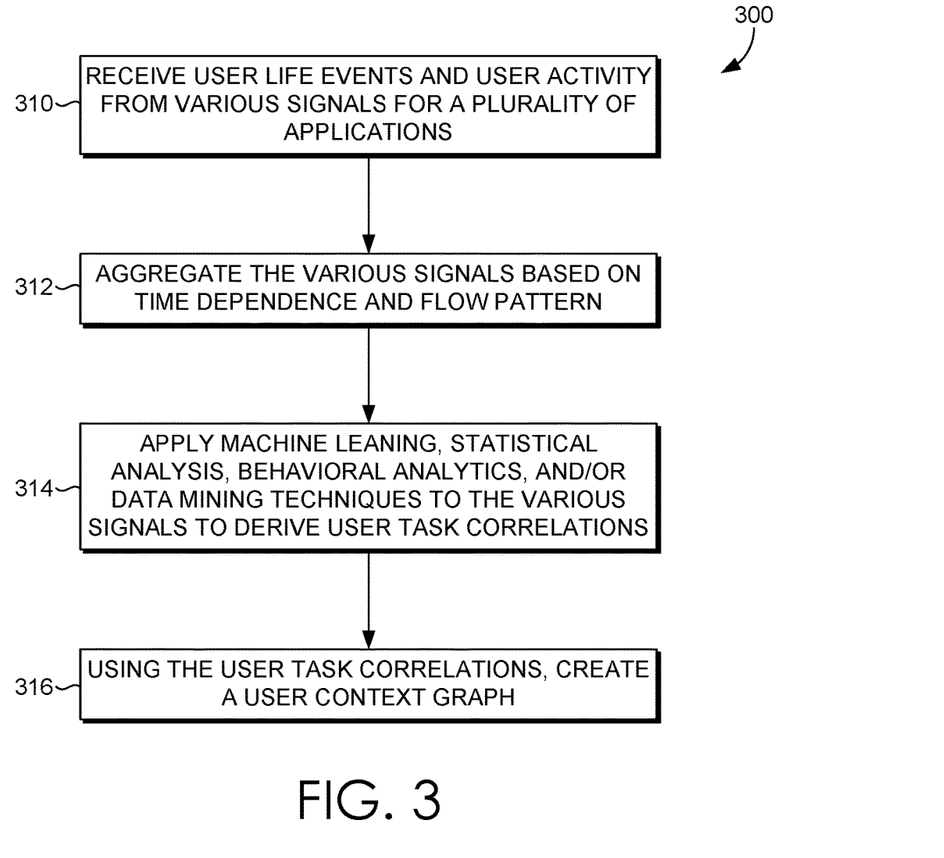
FIG. 3 is a flow chart showing a method of creating a user context graph, in accordance with aspects of the technology described herein.

Turning now to FIG. 3, a flow chart showing a method 300 of creating a user context graph is shown, according to an aspect of the technology described herein. Method 300 may be performed by any computing device (such as computing device described with respect to FIG. 1) with access to a contextual application organizer framework (such as the one described with respect to FIG. 2) or by one or more components of the contextual application organizer framework (such as user device 210 or device application manager 212).

At step 310, user life events and user activity (e.g., non-behavioral aspects) are received from various signals for a plurality of applications. A personal assistant service, such as MICROSOFT Cortana, may be present across all user devices. The personal assistant service may learn about user life events or user activity based on various signals (e.g., email, SMS, geo-location history, browsing history, web search history, application usage, device usage, etc.). The signals may identify a location, a current task, a planned task, or an appointment. In some embodiments, knowledge of the current task can be helpful to determine the next task that can be performed based on history and contextual response derived from the learned knowledge about the user.

In one example, an email, SMS message, browsing history, or web search history may indicate that the user is making plans to go to dinner or a movie in a particular area. Additionally, or alternatively, the geo-location history and application usage may indicate that whenever the user travels to that particular area, the user uses a transportation application, such as UBER. As can be appreciated, different signals from the user devices provide useful information that identify various life events and activities of the user.

User source information that deals with behavioral aspects can be written as a function of time and application flow pattern. At step 312, the various signals are aggregated based on time dependence and flow pattern. Time dependence takes into account the time dependence of the application usage. For example, a user might use a mail application in the morning context more often when compared with other time contexts of the day (e.g., afternoon, evening, night, etc.). Application flow pattern deals with the order in which multiple applications are used. For example, a user may typically interact with a restaurant application followed by a movie application followed by a transportation application. In doing so, the framework is able to learn the context in which a user interacts with multiple different applications, at an individual application level and at an aggregate level in a group of applications on a user device.

At step 314, machine learning, statistical analysis, behavior analytics, and/or data mining techniques are applied to the various signals to derive user task correlations. At step 316, the user task correlations are utilized to create a user context graph.

Figure 4:
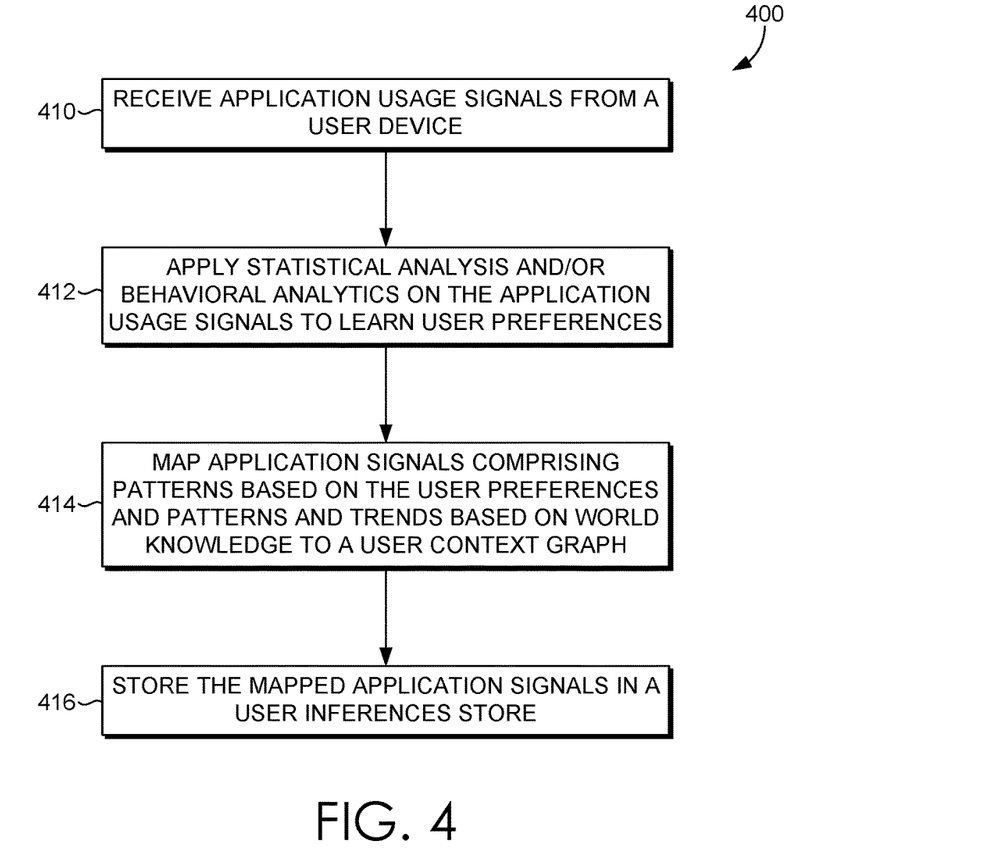
FIG. 4 is a flow chart showing a method of mapping application signals to a user context graph, in accordance with aspects of the technology described herein.

Turning now to FIG. 4, a method 400 of mapping applications signals to the user context graph is shown, according to an aspect of the technology described herein. Method 400 may be performed by any computing device (such as computing device described with respect to FIG. 1) with access to a contextual application organizer framework (such as the one described with respect to FIG. 2). Initially, as illustrated at step 410, application usage signals are received from a user device. In various embodiments, the application usage signals include application uniform resource identifier (URI), device identification (ID), timestamp, usage time, and the like. Statistical analysis and/or behavioral analytics is performed, at step 412, on the application usage signals to learn user preferences. The application usage signals enable the framework to gather the user specific application usage patterns. In some embodiments, user preferences take priority over world knowledge if the framework has already learned about a particular context for the user.

Additionally, or alternatively, and at an aggregate level, the framework applies statistical analysis, behavior analytics, and/or trend analytics to learn application usage patterns of other users in the world. This enables the framework to account for contexts that have not been experience by a particular user. In this way, if the user is new or has not experienced a particular context, world knowledge takes priority in surfacing the relevant applications for the user context.

The learned world knowledge can also be very useful when a user does a particular task in a new context. For example, a user might be traveling in a foreign country and looking for a restaurant, entertainment, or transportation. The application that is normally used in the native country of the user might not be helpful in the foreign country. Instead, a different application might provide more relevant information. Accordingly, in this instance, the world knowledge might take priority over the user preferences. Used for booking cab in the country might be different from the one he uses in his own country.

As can be appreciated, both types of signals (i.e., user preferences and world knowledge) are dynamically weighted, in some embodiments, on integration with the device application manager. Additionally, outputs of a user feedback mechanism are utilized to retrain the framework and update user preferences and world knowledge accordingly.

At step 414, the application signals comprising patterns based on the user preferences and patterns and trends based on world knowledge are mapped to a user context graph. Additionally, task conflation may be utilized to create aggregates of multiple tasks for the context. The aggregates of multiple tasks may be enable the framework to surface multiple relevant applications that can be used to accomplish multiple tasks for the given context (e.g., make dinner plans, purchase movie tickets, and find transportation). The context graph and the mapped application signals are stored, at step 416, in a user inferences store that is used to surface relevant applications, as described herein.

Figure 5:
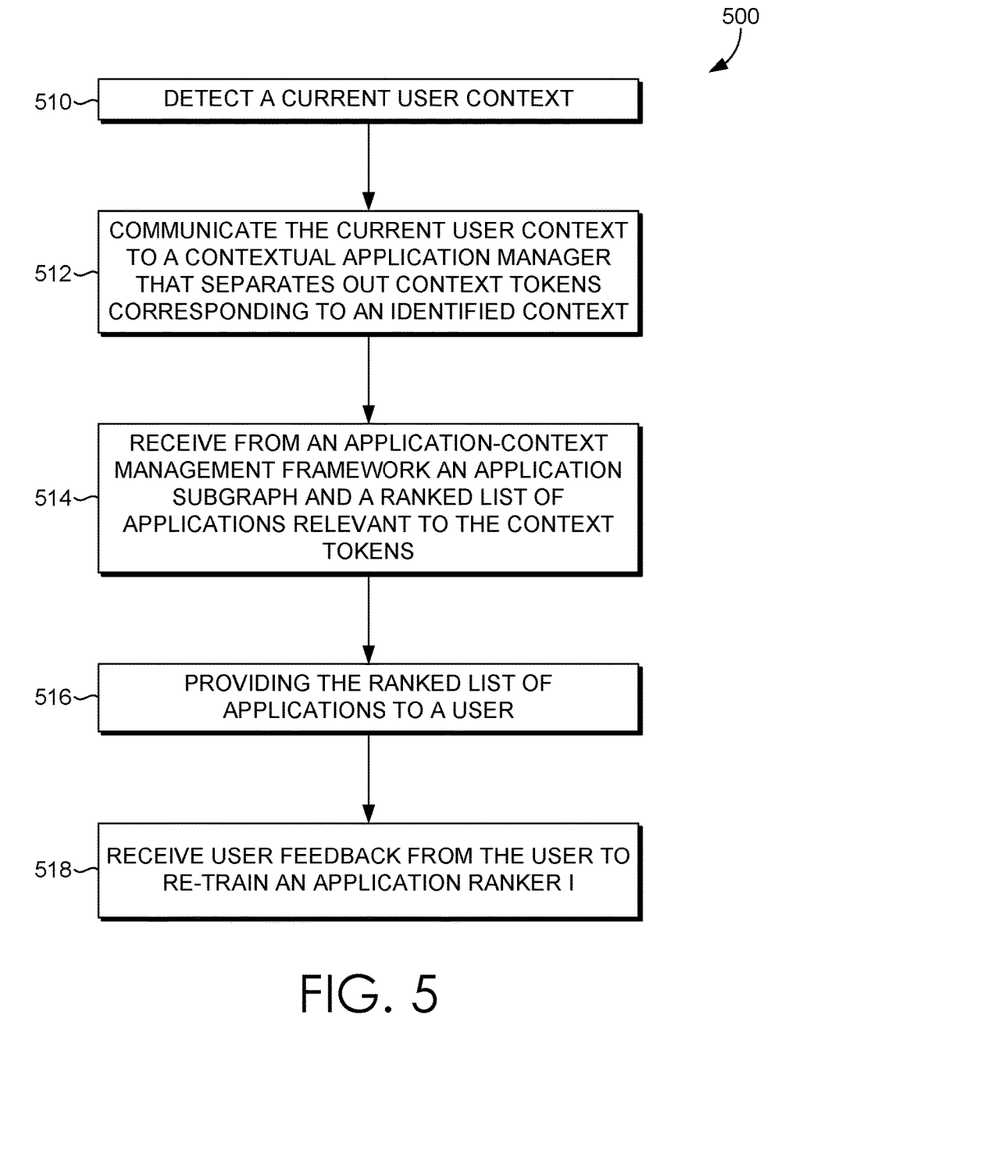
FIG. 5 is a flow chart showing a method of surfacing a ranked list of applications to a user, in accordance with aspects of the technology described herein.

Turning now to FIG. 5, a method 500 of surfacing a ranked list of applications to a user is shown, in accordance with aspects of the technology described herein. Method 500 may be performed by any computing device (such as computing device described with respect to FIG. 1) with access to a contextual application organizer framework (such as the one described with respect to FIG. 2). Initially, as illustrated at step 510, the current user context is detected. As described above, the context may be described in the user life events and user activity from the various signals for the plurality of applications.

The current user context is communicated to a contextual application manager as a context token, at step 512. The contextual application manager separates out context tokens corresponding to an identified context of the current user context. As used herein, context tokens may describe one or more tasks corresponding to an identified context. The framework ranks the tasks identified by the context tokens and creates an aggregated context subgraph. The aggregated context graph can be utilized to retrieve an application subgraph from the user inferences store.

At step 514, the application subgraph and a ranked list of applications relevant to the context tokens is received from the application-context management framework and provided to the contextual application manager. The applications are ranked based on the context tokens present in the detected user context. At step 516, the ranked list of applications is provided to a user via the contextual application organizer. Additionally, user feedback may be received from the user, at step 518, to re-train a ranker inside the contextual application organizer framework that ranks the applications provided by the contextual application manager. As can be appreciated, the application-context management framework provides enhanced personal assistant services by receiving multiple discrete pieces of information, applies reasoning to learn user preferences and world knowledge to multiple contexts, and identifies relevant applications corresponding to the context.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A method of providing a contextual application organizer framework, comprising:
creating a user context graph from user life events and an index of user activity of applications;
mapping application usage signals comprising user preferences and world knowledge to the user context graph;
upon detecting a current user context, passing the current user context to a contextual application manager which identifies context tokens corresponding to the current user context and passes them to an application-context management framework; and
surfacing relevant applications in a contextual application organizer, the relevant applications derived from the user context graph and communicated from the application-context management framework to the contextual application manager.

2. The method of claim 1, wherein the user life events are derived from monitoring emails, SMS, geo-location history, browsing history, web search history, app usage, or device usage.

3. The method of claim 1, further comprising applying one of machine learning, statistical analysis, behavioral analytics, or data mining techniques to the user life events to learn correlations between the user life events and the index of user activity of applications, the correlations utilized to create the user context graph.

4. The method of claim 1, wherein the user life events are derived from non-behavioral aspects, including location, current task, planned task, or appointments.

5. The method of claim 1, wherein the index of user activity of applications is derived from the user's time dependence of application usage and an application flow pattern.

6. The method of claim 1, further comprising mapping application signals to the user context graph, wherein user preferences takes higher priority over world knowledge if the contextual application organizer framework has already learned about a particular context corresponding to a particular user life event.

7. The method of claim 1, further comprising mapping application signals comprising user preferences and world knowledge to the user context graph, wherein world knowledge takes priority over user preferences if the contextual application organizer framework has not learned about a particular context corresponding to a particular user life event.

8. The method of claim 1, further comprising applying a dynamic weighting mechanism that changes based on integration with a device application manager and user feedback mechanism.

9. The method of claim 1, further comprising feeding outputs of the dynamic weighting mechanism into the user preferences and world knowledge.

10. The method of claim 1, further comprising mapping application signals comprising user preferences and world knowledge to the user context graph, wherein task conflation is utilized to aggregate multiple tasks for a particular context corresponding to a particular user life event.

11. The method of claim 1, further comprising storing a context graph with application signals in an inferences store.

12. The method of claim 1, further comprising ranking the tasks corresponding to the context tokens and creating an aggregated context subgraph.

13. The method of claim 12, further comprising utilizing the aggregated context graph, retrieving retrieve a context-application subgraph from the inferences store.

14. The method of claim 13, further comprising providing the retrieved set of applications along with the context subgraph to the contextual application manager.

15. The method of claim 14, further comprising ranking the applications based on the context tokens that are present in the detected user context.

16. The method of claim 15, further comprising presenting the ranked list of applications to the user via a contextual application organizer.

17. The method of claim 16, further comprising receiving user feedback that is used to re-train a ranker inside the contextual application organizer framework.

18. A computer-readable storage media comprising computer-executable instructions, that when executed by a computer, causes the computer to perform operations to facilitate providing a contextual application organizer framework, the operations comprising:
   creating a user context graph from user life events and an index of user activity of applications;
   mapping application usage signals comprising user preferences and world knowledge to the user context graph;
   upon detecting a current user context, passing the current user context to a contextual application manager which identifies context tokens corresponding to the current user context and passes them to an application-context management framework; and
   surfacing relevant applications in a contextual application organizer, the relevant applications derived from the user context graph and communicated from the application-context management framework to the contextual application manager.

19. A computerized system:
   a processor; and
   a computer storage medium storing computer-useable instructions that,
   when used by the processor, cause the processor to:
   create a user context graph from user life events and an index of user activity of applications;
   map application usage signals comprising user preferences and world knowledge to the user context graph; and
   upon detecting a current user context, passing the current user context to a contextual application manager which identifies context tokens corresponding to the current user context and passes them to an application-context management framework; and
   surface relevant applications in a contextual application organizer, the relevant applications derived from the user context graph and communicated from the application-context management framework to the contextual application manager.

* * * * *